Sept. 20, 1932.   R. P. KIELSMEIER   1,877,890
POULTRY FEEDING DEVICE
Filed Aug. 5, 1929
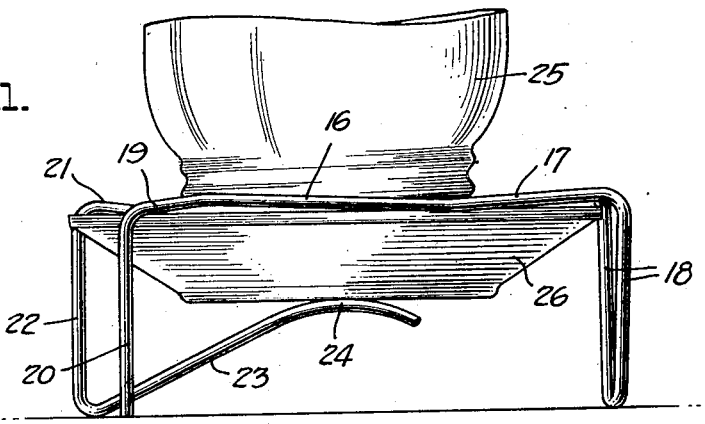
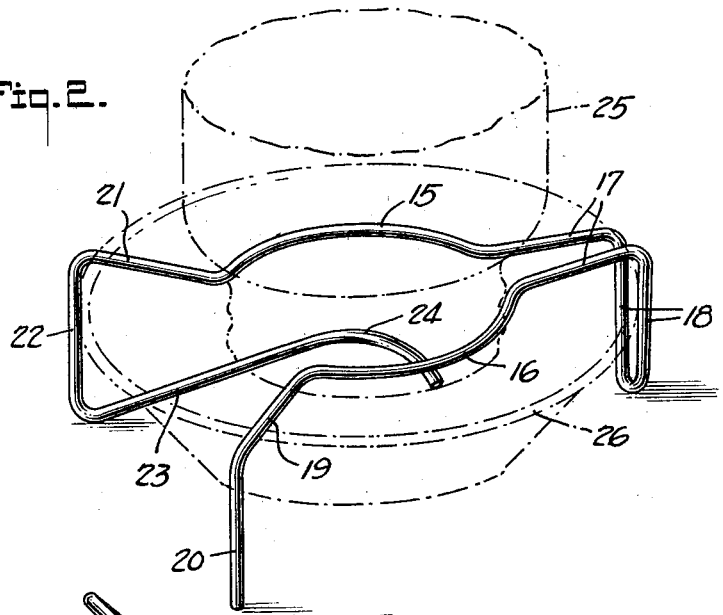
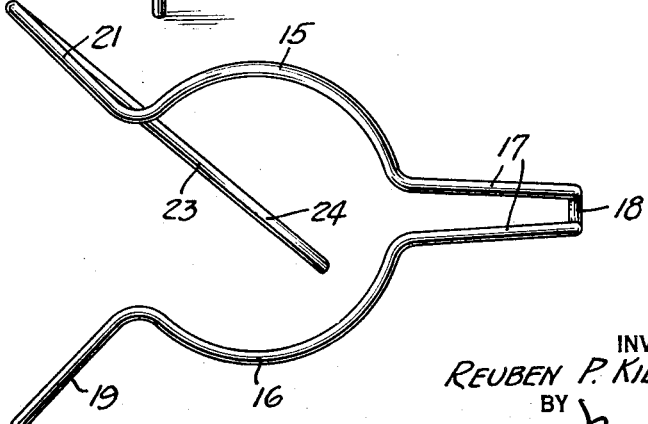
INVENTOR
REUBEN P. KIELSMEIER
BY
ATTORNEYS Patented Sept. 20, 1932

1,877,890

UNITED STATES PATENT OFFICE

REUBEN P. KIELSMEIER, OF BALDWIN PARK, CALIFORNIA

POULTRY-FEEDING DEVICE

Application filed August 5, 1929. Serial No. 383,655.

My invention relates to devices for automatically supplying to a vessel a quantity of fluid material as it is withdrawn from the vessel, and it has particular reference, although not necessarily, to a poultry-feeding device.

It is a purpose of my invention to provide in a poultry-feeding device a simple and durable form of support or stand by means of which a water or feed reservoir and a conventional form of dish or other vessel are supported in such relation to each other that the water or feed will be automatically fed from the reservoir to the vessel. My invention is especially adapted for the feeding of baby chickens, and the stand is such as to permit of a horizontal or edgewise adjustment of the dish or vessel so as to increase the feeding or drinking area between the reservoir and dish so as to accommodate the heads of the baby chickens as they increase in size.

A further purpose of my invention is the provision of a stand which is capable of holding a conventional form of fruit jar and a conventional form of dish, where the jar constitutes the reservoir containing the water or feed, and the dish the vessel which is supplied with water or feed from the jar.

I will describe only one form of poultry-feeding device embodying my invention, and will then point out the novel features thereof in claims.

In the accompanying drawing:

Fig. 1 is a view showing in side elevation one form of poultry-feeding device embodying my invention.

Fig. 2 is a view showing the stand of the device in perspective and with the reservoir and vessel in dot and dash lines.

Fig. 3 is a view showing the stand of the device in top plan.

In carrying out my invention, I provide a stand or support which in its present embodiment is made from a single length of resilient wire bent between the ends to form a pair of complemental arcuate jaws 15 and 16. From one end of these jaws the wire is projected radially to form extensions 17 having portions bent downwardly and connected at their lower ends to form a leg 18. The extensions 17 as well as the parts of the leg 18 are disposed in converging relation to each other, the parts of the leg being connected and disposed substantially at right angles to the extension 17, the required rigidity is imparted to the wire to maintain the jaws 15 and 16 against undue spreading, and yet allowing them to yield to permit the insertion or withdrawal of a circular vessel to or from between the jaws.

The opposite end of the jaw 16 is extended radially to provide an extension 19 and then downwardly to form a leg 20. The corresponding end of the jaw 15 is likewise extended radially to form an extension 21, and then downwardly to provide a leg 22. It will be understood that the several legs 18, 20 and 22 are spaced and act conjointly to effectively support the jaws in horizontal and elevated position so that the stand may effectively perform the functions for which it is intended. The leg 22 is extended inwardly of the stand to form an arm 23 which projects upwardly to a point substantially central of the circle defined by the jaws 15 and 16, the free end of the arm being bent downwardly so that a raised portion 24 is provided for physical contact with a dish or other vessel to be supported.

In the use of the stand I may employ a conventional form of fruit jar, such as the Mason jar 25 shown in Figs. 1 and 2, and also a conventional form of dish 26. As will be understood, the jar 25 constitutes the reservoir in which a supply of water or feed is contained, while the dish 26 constitutes the vessel which is automatically filled with the water or feed from the reservoir. In the applied position of these two receptacles to the stand, the neck of the jar 25 is embraced by the jaws 15 and 16 with such degree of security as to firmly hold the jar in inverted and vertical position. The dish 26 is extended beneath the extensions 17, 19 and 21 and above the arm 23, and in this manner the arm 23 is caused to coact with the extensions to firmly clamp the dish and thus hold the latter in elevated position beneath the neck of the jar so as to be fed with the material contained in the jar. The length of the extensions 17, 19 and 21 in respect to the diameter of the dish is such that the dish is capable of being shifted horizontally or edgewise in order that it may occupy a position eccentric with respect to the jar neck. In this manner the space between the jar neck and the outer edge of the dish may be varied to accommodate the heads of baby chickens in various degrees of growth or size.

Although I have herein shown and described only one form of poultry-feeding device embodying my invention, it is to be understood that various changes and modifications may be made herein without departing from the spirit of the invention and the spirit and scope of the appended claims.

I claim:

1. A poultry-feeding device comprising a stand having companion jaws coacting to embrace and support a reservoir, legs for supporting the jaws in elevated position, and means beneath the jaws and coacting with the latter for securing a vessel in position to receive the contents of the reservoir.

2. A poultry-feeding device comprising a stand having companion jaws for embracing and supporting a reservoir, extensions on the jaws bent to form legs for supporting the jaws in elevated position, and means beneath the jaws and coacting with the extensions for securing a vessel beneath the reservoir.

3. A poultry-feeding device comprising a stand having reservoir supporting means, legs for supporting said means in elevated position, and an arm on one of the legs coacting with said means for supporting a vessel in position to receive the contents of the reservoir.

4. A poultry-feeding device comprising a stand having companion jaws for embracing and supporting a reservoir, radial extensions on the jaws, legs depending from the extensions, and an arm on one of the legs coacting with the extensions to embrace and support a vessel in position to receive the contents of the reservoir.

5. A poultry-feeding device comprising a stand including complemental jaws having terminal extensions, two of which are connected to provide a resilient connection between the jaws, all of the extensions having portions bent downwardly to form legs, and one of the extensions having an arm projecting upwardly to a point substantially central of and beneath the jaws.

REUBEN P. KIELSMEIER.